(12) United States Patent
Grumbine

(10) Patent No.: US 7,093,722 B2
(45) Date of Patent: Aug. 22, 2006

(54) POLISHING COMPOSITION STORAGE CONTAINER

(75) Inventor: Steven K Grumbine, Aurora, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 191 days.

(21) Appl. No.: 10/300,196

(22) Filed: Nov. 20, 2002

(65) Prior Publication Data

US 2004/0094489 A1    May 20, 2004

(51) Int. Cl.
*A46B 17/00* (2006.01)
(52) U.S. Cl. .................. 210/526; 210/522; 210/519; 210/802; 210/803; 15/264; 220/608; 220/607; 220/571
(58) Field of Classification Search ............... 220/608, 220/607, 571; 15/264; 210/521, 526, 522, 210/519, 802, 803
See application file for complete search history.

(56) References Cited

U.S. PATENT DOCUMENTS

| | | | |
|---|---|---|---|
| 3,963,624 A | 6/1976 | Henderson et al. | |
| 4,351,733 A | 9/1982 | Salzer et al. | |
| 4,577,775 A * | 3/1986 | Kresin | 220/604 |
| 4,701,260 A * | 10/1987 | Lee | 210/521 |
| 4,878,264 A | 11/1989 | Young | |
| 4,883,603 A | 11/1989 | Roggenstein et al. | |
| 5,597,085 A | 1/1997 | Rauworth et al. | |
| 5,687,444 A * | 11/1997 | Hakker | 15/104.92 |
| 5,794,818 A | 8/1998 | Bromwell et al. | |
| 5,971,199 A | 10/1999 | Jackson et al. | |
| 6,124,207 A | 9/2000 | Robinson et al. | |
| 6,244,459 B1 | 6/2001 | Bouc et al. | |
| 6,352,469 B1 | 3/2002 | Miyazaki et al. | |
| 2001/0044265 A1 | 11/2001 | Kim et al. | |
| 2002/0050494 A1 | 5/2002 | Rauworth et al. | |

* cited by examiner

*Primary Examiner*—Minh-Chau T. Pham
(74) *Attorney, Agent, or Firm*—Robert Lanning; Nancy Gettel

(57) ABSTRACT

The invention provides devices and methods for removing and trapping large and/or dense abrasive particles from a polishing slurry. The polishing slurry is introduced into a container and allowed to stagnate, thereby causing large and/or dense particles to separate from the slurry under the influence of gravity. The container includes a cavity or plurality of cavities defined by an inner surface of the container into which the separated particles sink. To prevent the large and/or dense particles from becoming re-suspended into the slurry, the size and shape of the cavity is relatively deep and narrow with respect to the large and/or dense particles, thus providing a trapping effect. The cavities do not effectively trap the smaller particles.

29 Claims, 19 Drawing Sheets

FIG. 5

POLISHING COMPOSITION STORAGE CONTAINER

FIELD OF THE INVENTION

This invention pertains generally to polishing slurries and more specifically to methods and apparatuses for removing large or dense abrasive particles from polishing slurries.

BACKGROUND OF THE INVENTION

Polishing processes, such as chemical-mechanical polishing ("CMP"), are used in the manufacturing of microelectronic devices to form flat surfaces on semiconductor wafers, field emission displays, and many other microelectronic substrates. For example, the manufacture of semiconductor devices generally involves the formation of various process layers, selective removal or patterning of portions of those layers, and deposition of yet additional process layers above the surface of a semiconducting substrate to form a semiconductor wafer. The process layers can include, by way of example, insulation layers, gate oxide layers, conductive layers, and layers of metal or glass, etc. It is generally desirable in certain steps of the wafer process that the uppermost surface of the process layers be planar, i.e., flat, for the deposition of subsequent layers. Polishing is used to planarize process layers wherein a deposited material, such as a conductive or insulating material, is polished to planarize the wafer for subsequent process steps.

In a typical polishing process (e.g., a CMP process), a substrate is mounted upside down on a carrier in a polishing tool. A force pushes the carrier and the wafer downward toward a polishing pad. The carrier and the wafer are rotated above the rotating polishing pad on the polishing tool's polishing table. A polishing composition, also known as a polishing slurry, generally is introduced between the rotating wafer and the rotating polishing pad during the polishing process. Polishing slurries are widely available, and, as a consumable component of the polishing process, typically must be replenished. To transport and store the slurries, they are provided in a variety of containers ranging in shape and capacity.

For physically removing portions of the process layers, polishing slurries often contain an abrasive material in an aqueous solution. Typical abrasive materials comprise metal oxides (e.g., silicon dioxide, cerium oxide, aluminum oxide, zirconium oxide, tin oxide, coformed particles thereof, and combinations thereof), diamond, boron nitrides, silicon carbide, polymeric materials, and combinations thereof. U.S. Pat. No. 5,527,423, for example, describes a method for chemically-mechanically polishing a metal layer by contacting the surface with a polishing slurry comprising high purity fine metal oxide particles in an aqueous medium. The type of abrasive material selected will depend on the type of substrate being polished. The size of the abrasive particles suspended in the slurry generally ranges from about 1 nanometer (e.g. $1\times10^{-9}$ meters) to several microns (e.g. $1\times10^{-6}$ meters), or more. While particles on the order of 20 nanometers to a micron typically function well as abrasives, it has been found that larger abrasive particles (e.g., agglomerates of abrasive particles) may scratch or cause other defects on the polished surfaces of the substrate. Similarly, abrasive particles having a density or hardness significantly greater than the average density or hardness of the abrasive particles can also produce defects during polishing of substrate surfaces. The presence of such defects can ruin the substrate or substantially impair the performance of the finished semiconductor device. To reduce surface defectivity, it is desirable to eliminate undesirably large or dense abrasive particles from the polishing slurry. Therefore, a major focus on the part of slurry manufactures has been to reduce the number of large and/or dense abrasive particles, typically by better controlling the particle production process, dispersion process, or filtering process. Despite these efforts, larger and/or denser particles continue to be present in slurries and surface defectivity remains a problem.

BRIEF SUMMARY OF THE INVENTION

The invention provides apparatuses and methods for entrapping and removing larger and/or denser particles from a polishing slurry. The invention relies upon gravimetric separation of the larger and/or denser particles from the slurry while the slurry is held in an substantially un-agitated state in a container. Gravimetric separation is the tendency of particles to settle or precipitate out of the slurry under the influence of gravity. Because the larger and/or denser particles are typically heavier, they tend to separate out at a faster rate than the lighter, smaller particles. To accommodate the larger and/or denser particles and prevent them from again becoming suspended in the slurry when the slurry is agitated, a cavity or plurality of cavities is provided along the lower, interior surface of a storage container. The undesirably abrasive particles separate out of the slurry and settle within the cavity or cavities. The size and shape of the cavity are formed so that the larger and/or denser particles cannot easily work their way back into the slurry and thus become trapped within the cavity. Hence, when the slurry is emptied from the storage container for use with a polishing device, a number of the larger and/or denser particles remain within the container reducing the chances of damaging the substrate.

To provide further separation of the larger and/or denser particles, the slurry can be repeatedly agitated and allowed to settle within the container. The repeated agitation causes some of the settled particles to become dispersed back into the slurry. In the reverse of gravimetric separation, the smaller, lighter and less dense particles will more readily become dispersed back into the slurry than the larger and/or denser particles. As the slurry again stagnates, the larger and/or particles will separate out first and settle within the cavity or cavities on top of the previously trapped, larger and/or denser particles. Repeating this process increases the chances that undesirable large and/or dense particles will become trapped within the container while the smaller, desirable particles stay suspended in the slurry. This process may occur during transportation of the slurry.

An advantage of the invention is that it reduces the occurrence of surface defects by reducing the number of large and/or dense, abrasive particles suspended in a polishing slurry. Another advantage is that the invention utilizes the physical tendency of large and/or dense particles to separate from a slurry and thus functions while the slurry is stored in a container. As such, the invention advantageously provides a low cost way of reducing the number of large and/or dense, abrasive particles in a slurry. These and other advantages of the present invention, as well as additional inventive features, will become apparent from the description of the invention provided herein.

DETAILED DESCRIPTION OF THE INVENTION

Figure 1:
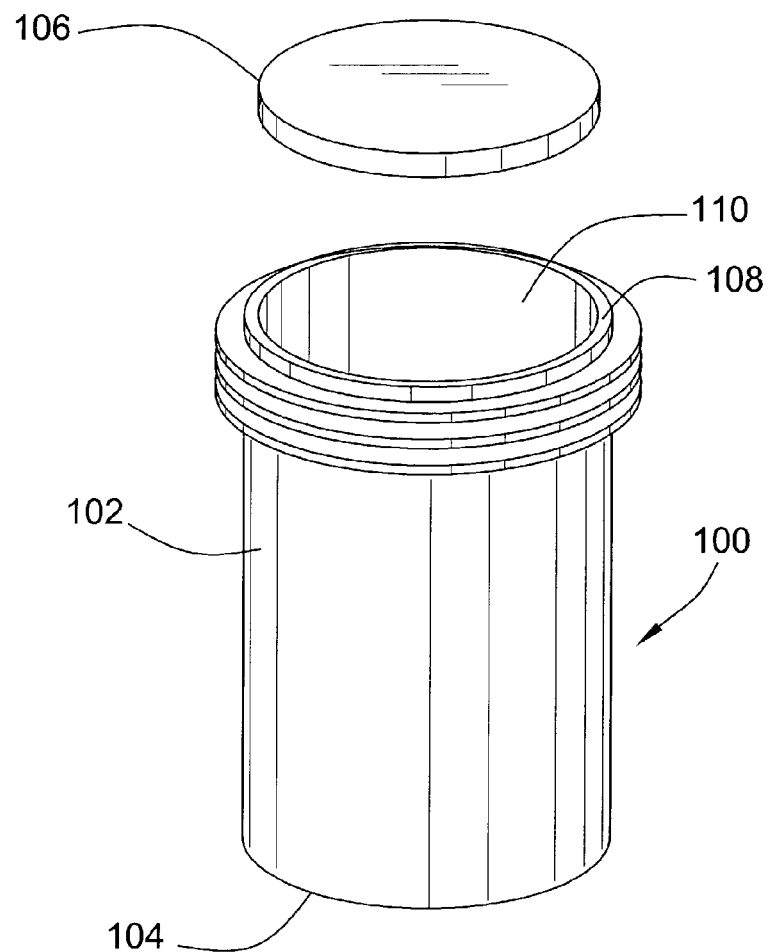
FIG. 1 is a perspective view of a pail for storing and transporting a polishing slurry.
Figure 2:
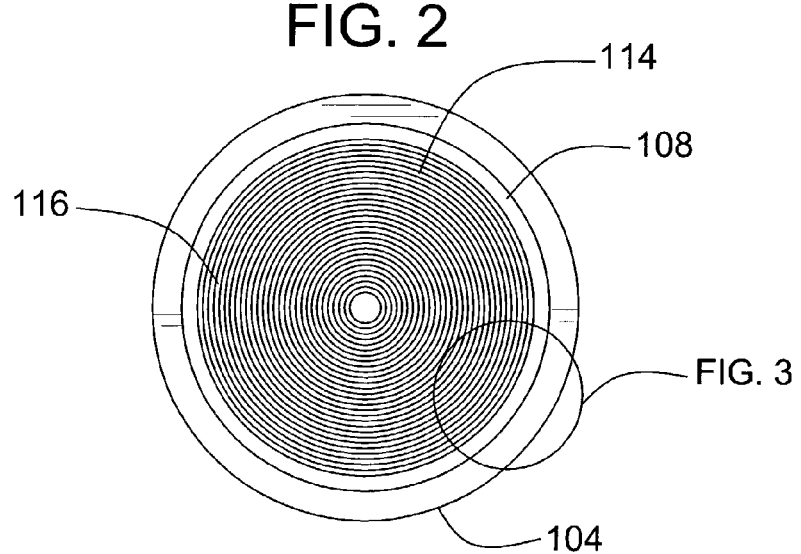
FIG. 2 is a top plan view of the pail of FIG. 1 showing the cavities in the form of concentric grooves.
Figure 3:
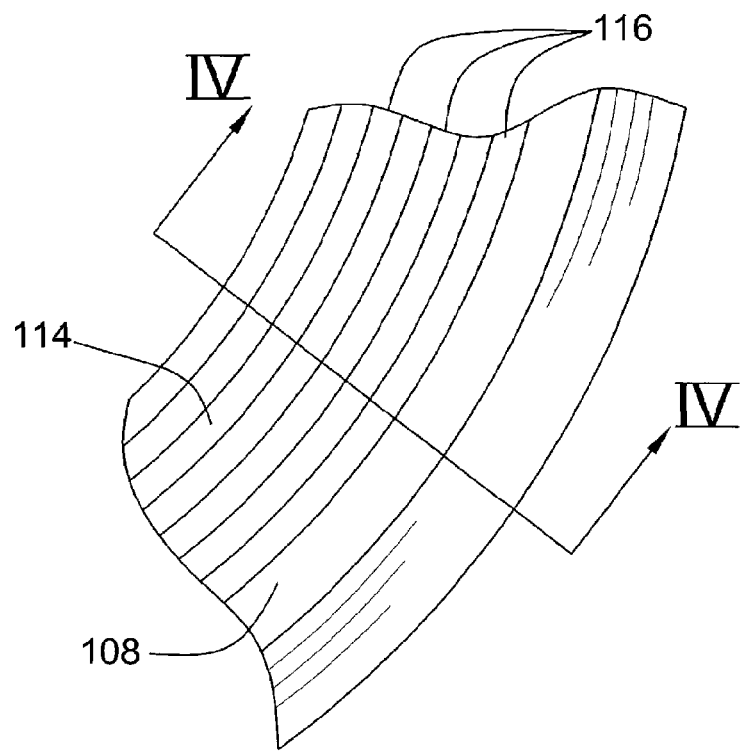
FIG. 3 is a detailed view of the indicated section of FIG. 2.

With reference to the drawings, wherein like reference numerals refer to like elements, there is shown in FIG. 1 a container for storing and transporting a polishing slurry (e.g., polishing composition) for use in a polishing process (e.g., a chemical-mechanical polishing "CMP" process). The container can have any suitable shape and can have any suitable volumetric capacity (e.g., about 1 liter to about 2,000 liters). The container comprises an opening for receiving and/or emptying the slurry. The opening can be any suitable opening, many examples of which are described herein. An illustrative container (see FIG. 1) is a pail 100 having a cylindrical body 102 and a bottom 104 which define a volume for receiving the slurry. In other embodiments, the container may be square or rectangular in shape. To seal the volume, a lid 106 may be provided which snaps over the rim 108 and covers the opening (e.g., mouth) 110 of the pail. The pail is preferably made from plastic and can be formed by a blow molding process. The volumetric capacity of the pail preferably ranges from 1 liter to 50 liters. As illustrated best in FIGS. 2, 3, and 4, there is formed on the interior surface 114 of bottom 104 a plurality of concentric grooves 116. The grooves are disposed into the bottom 104 so that the interior surface 114 defines both a plane 118 and a plurality of cavities 120 recessed into the plane. The term "cavity" refers to the empty space defined by a surface while the term "groove" refers to the pattern creating the empty space.

In accordance with the teachings of the invention, there is provided a container for storing and transporting a slurry having abrasive particles of various sizes suspended therein. When the slurry is substantially stagnate within the container, the larger and/or denser abrasive particles separate out of the slurry under the influence of gravity and settle on an interior surface of the container. To trap these settled larger and/or denser abrasive particles, the interior surface defines a recessed cavity or a plurality of recessed cavities into which the settled particles may fall. The cavity is preferably sized and shaped to prevent the larger and/or denser abrasive particles from working their way back out of the cavity when the slurry is agitated. As such, the container traps and removes the larger and/or denser abrasive particles while the smaller and/or less dense particles (e.g., abrasive particles having a mean particle size of about 1 micron or smaller, or about 20–500 nanometers) remain suspended in the slurry. Slurry from the containers of the invention is therefore less likely to produce surface defects when used in polishing or lapping processes.

Figure 4:
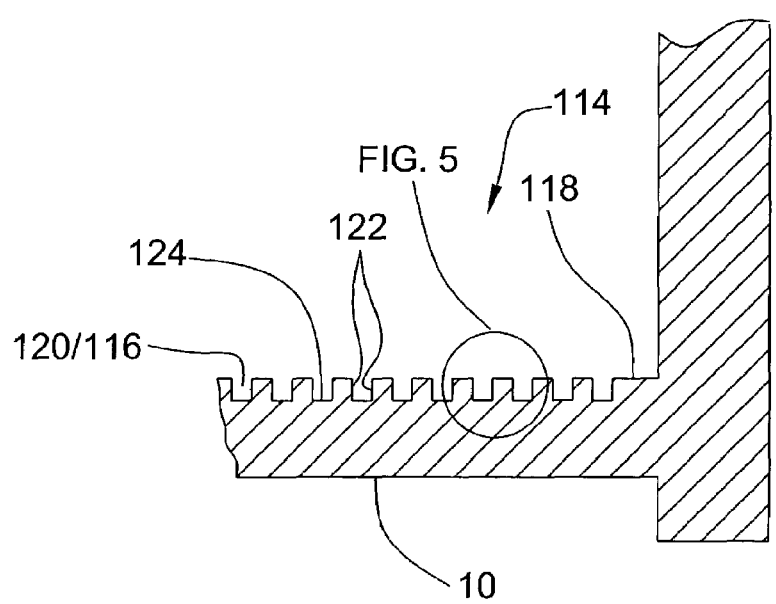
FIG. 4 is a cross-sectional view taken along line IV—IV of FIG. 3 showing the cross-section of the cavities.

As shown in the embodiment illustrated in FIG. 4, the cavities 120 are rectangular in shape and defined by sidewalls 122 and cavity floor 124. If the pail is made of plastic, the cavities can be formed when the pail is molded. Otherwise, the cavities can be cut, burned, stamped or otherwise formed. The size of the particles intended to be trapped by the container will vary with the specific use intended for the polishing slurry. Accordingly, the size and shape of the cavities will vary with the type of polishing slurry being stored in the container. Typically, the width of the cavities is about 10 millimeters or less (e.g., about 10 millimeters to about 0.5 millimeters). The depth of the cavities typically are about 10 millimeters or less (e.g., about 10 millimeters to about 0.5 millimeters). The individual cavities (and thus the concentric grooves) preferably are separated by a centerline-to-centerline distance of less than about 20 millimeters (e.g., about 2 mm to about 20 mm, or even about 2 mm or less). The distance separating the cavities (on an edge-to-edge basis) can accordingly vary with the widths of the cavities themselves. The precise dimensions of the cavities desirably are varied to optimize the container for a particular type of slurry.

Figure 5:
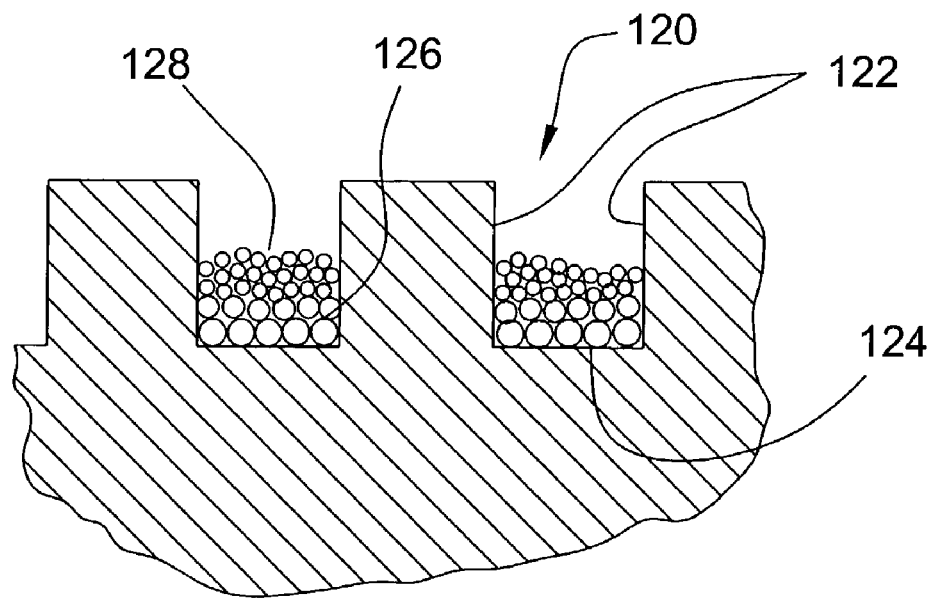
FIG. 5 is a detailed view of the indicated section of FIG. 4 when the slurry is substantially stagnate.

When the polishing slurry is placed into the storage container and is maintained in a substantially un-agitated or stagnant condition, (i.e. not intentionally agitated) the larger and/or denser abrasive particles typically separate out of the slurry by gravitational separation. Gravitational separation is the tendency of heavy particles to separate out of a slurry under the influence of gravity and is well understood by those of skill in the art. As illustrated in FIG. 5, the large and/or denser particles 126 separate out of the slurry and sink to the bottom of the cavity floor 124. The longer the slurry remains substantially stagnate, the longer gravity influences the suspended particles resulting in the chance that more particles of medium and smaller sizes and/or densities will settle out. As such, the particles tend to form layers in the cavities with the largest and/or densest particles 126 at the bottom and the smaller particles 128 nearer to the top. It is believed that after a period of about five days of remaining substantially stagnate, a sufficient number of the largest and densest particles will have settled from the slurry to reduce the likelihood that the slurry will damage the substrate during polishing. It is further believed that extending the settling period to about two or more weeks would improvably increase the number of larger and denser particles that have settled form the slurry. Typically, the slurry remains in the container for a period of about 5 days or more (e.g., about 10 days or more, or even 14 days or more).

Figure 6:
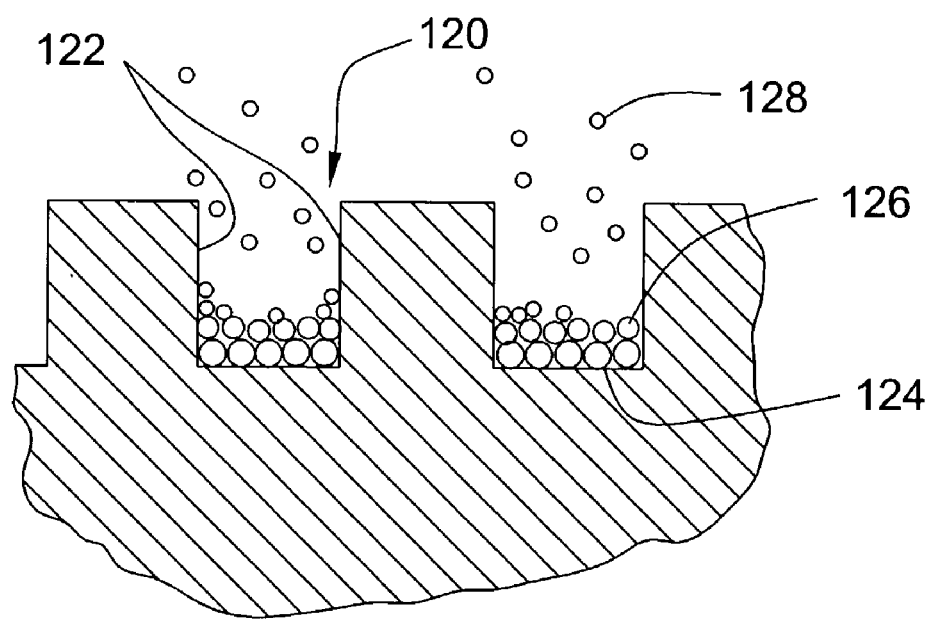
FIG. 6 is a detailed view of the indicated section of FIG. 4 when the slurry is agitated.

Preferably, to prevent the larger and/or denser particles from easily escaping back out of the cavity 120 when the slurry is agitated, the cavity is relatively deep and narrow compared to the size of the larger and/or denser particles. Preferably, the depth of the cavities is on the order of about 0.5 to about 10 millimeters. As illustrated in FIG. 6, when the slurry is agitated, the recessed nature of the cavities will by and large protect the particles contained therein from the turbulent currents otherwise tending to lift the particles back into the slurry. Additionally, the steep walls 122 and narrow width of the cavities act as obstacles to particles attempting to escape the cavity 120. Specifically, the larger and/or denser particles rising from the cavity floor 124 will, because of their size, likely encounter the cavity walls 122 and be deflected back into the cavity. These features, combined with the inertia generated by gravity continuing to pull upon the large and/or denser particles, reduce the likelihood that large and/or dense particles will become re-dispersed back into the slurry where the particles can damage a substrate.

Advantageously, the features that act to prevent the larger and/or denser particles from escaping the cavities do not have as significant a retaining effect upon the smaller, less dense abrasive particles. Because of the reduced size of the smaller abrasive particles, the widths of the cavities 120 are relatively much larger to these smaller particles, making it easier for them to escape the cavity. Hence, the smaller particles tend to become re-suspended in the slurry more readily than the larger and/or denser particles. An advantage of this tendency is that the container can be repeatedly agitated and allowed to stagnate in order to optimize the separation and trapping of the larger and/or denser particles. For instance, referring to FIG. 5, some smaller, lighter particles may have separated quickly and become distributed among the trapped larger and/or denser particles. Through repeated cycles of agitation and separation, though, the largest and/or densest particles will gather at the very bottom of the cavity where they are least likely to escape. Additionally, prior to use in a polishing process, the polishing slurry can be stirred in the container to achieve a uniform distribution of smaller particles throughout the slurry while the larger and/or denser particles remain trapped in the cavities.

Figure 7:
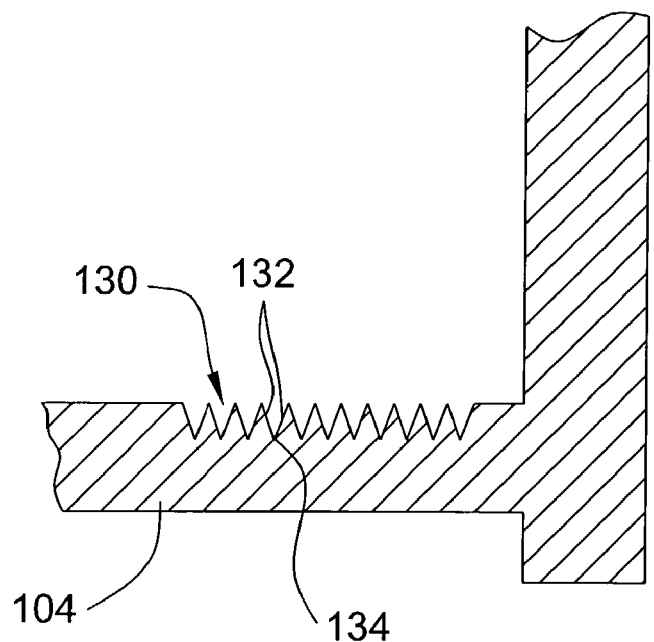
FIG. 7 is a cross-sectional view of FIG. 4 showing an alternative cross-section of the cavities.
Figure 8:
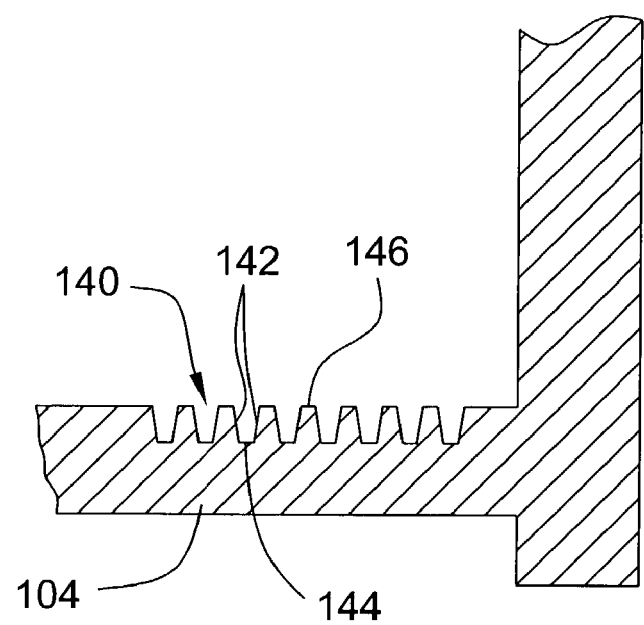
FIG. 8 is a cross-sectional view of FIG. 4 showing another alternative cross-section of the cavities.

Of course, the cavities need not be rectangular in shape to retain the large and/or dense abrasive particles. Accordingly, in the embodiment illustrated in FIG. 7, the cavities 130 are shaped as V's and defined by two sidewalls 132 tapering into the container bottom 104 and intersecting at a point 134. In the embodiment illustrated in FIG. 7, the cavities are illustrated immediately adjacent one another. However, embodiments in which the V-shaped cavities are space apart from one another are also contemplated. Furthermore, as in the embodiment illustrated in FIG. 8, the cavities 140 are shaped as truncated V's with the tapering sidewalls 142 intersecting a cavity floor 144. In this embodiment, the cavities are spaced apart from each other by rings 146 that would be formed on the interior surface of the pail.

Figure 9:
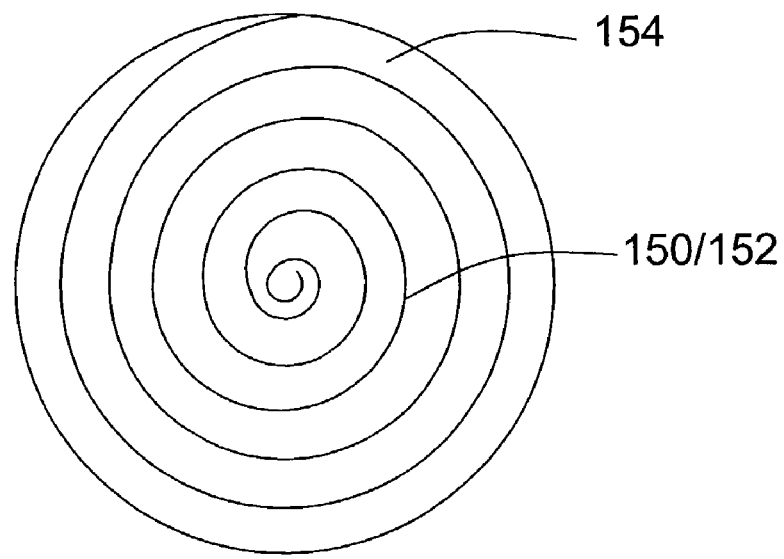
FIG. 9 is a top plan view of FIG. 2 showing another embodiment in which the cavities are in the form of a spiral groove.
Figure 10:
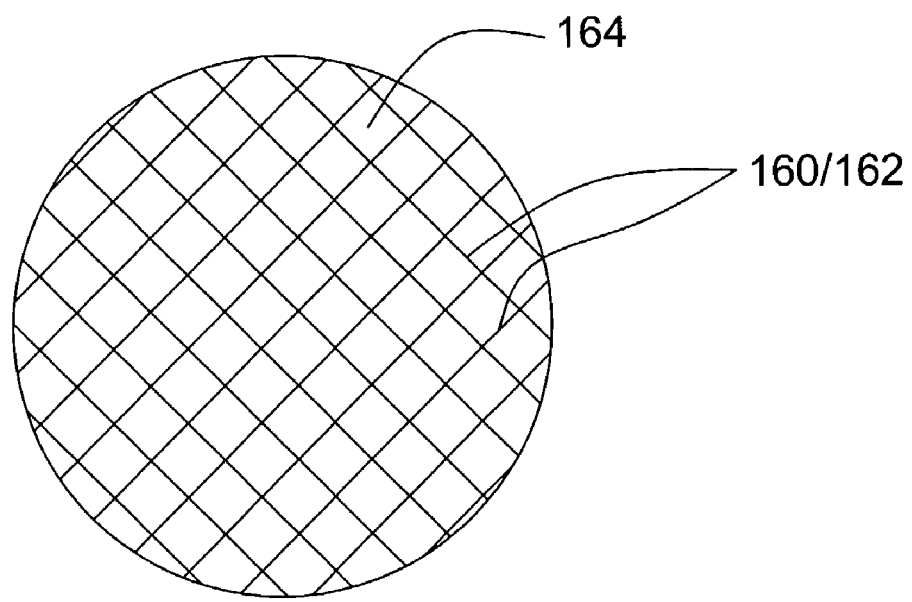
FIG. 10 is a top plan view of FIG. 2 showing another embodiment in which the cavities are in the form of cross-hatched grooves.

Additionally, the grooves used to form the cavities need not be patterned as concentric circles. In the embodiment illustrated in FIG. 9, the groove 150 defined on the interior surface 154 of the container is patterned as a continuous spiral. As such, groove 150 forms one continuous cavity 152. The cavity 152 may have any appropriate shape and functions in the above-described manner. In the embodiment illustrated in FIG. 10, multiple straight grooves 160 are formed on the interior surface 164 in a crosshatch pattern. Again, a single cavity 162 is defined by grooves 160. The cavity 162 may have any appropriate shape and functions in the above-described manner.

Figure 11:
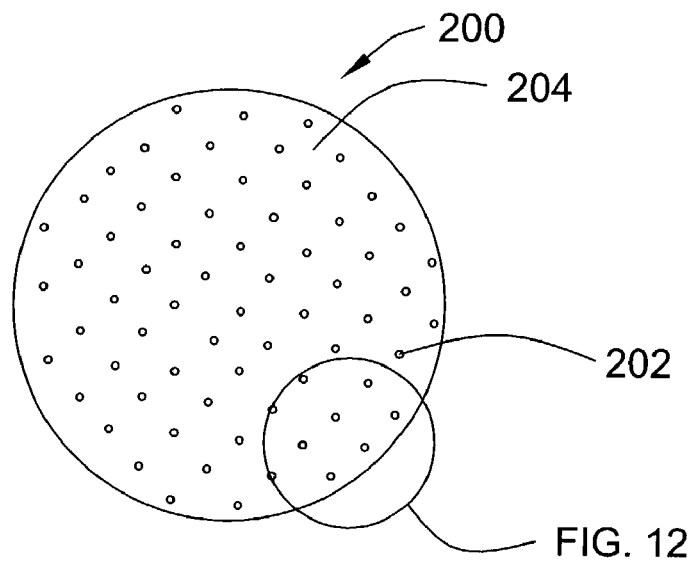
FIG. 11 is a top view of FIG. 2 showing another embodiment in which the cavities are a plurality of holes.
Figure 12:
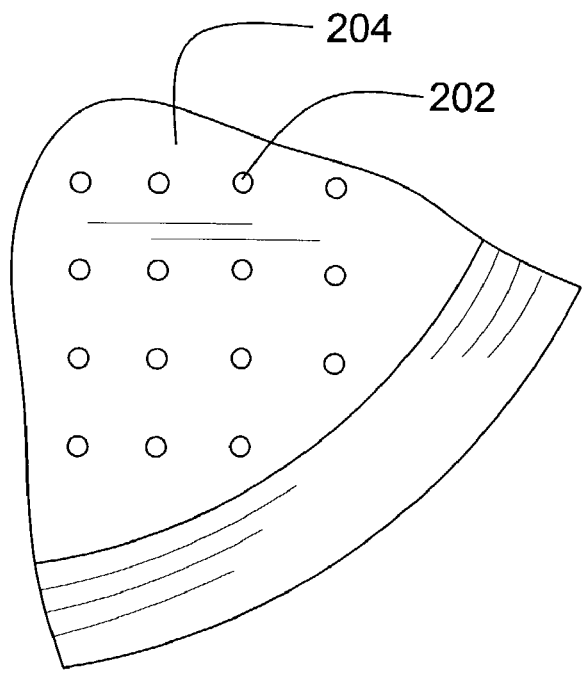
FIG. 12 is a detailed view of the indicated section of FIG. 11 showing the profile of the holes.
Figure 13:
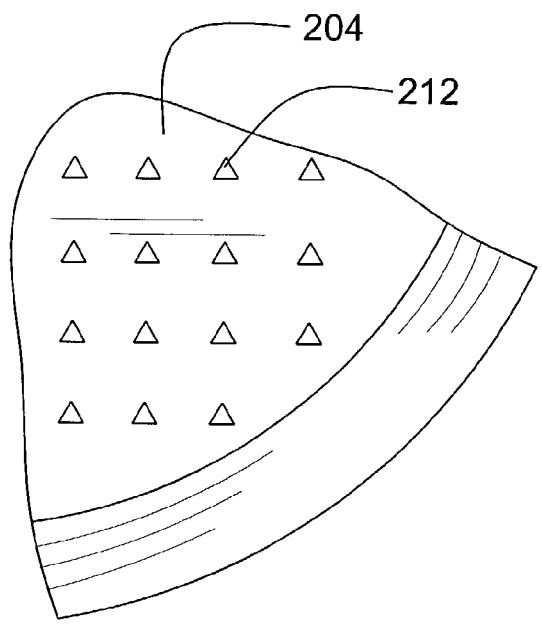
FIG. 13 is a detailed view of the indicated section of FIG. 11 showing an alternative profile of the holes.
Figure 14:
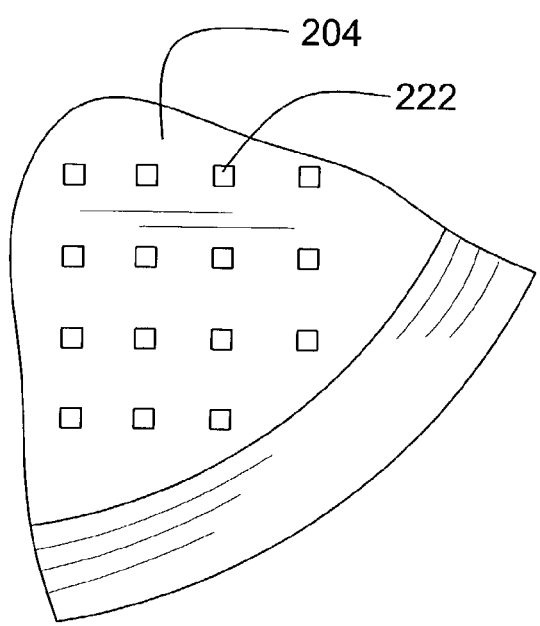
FIG. 14 is a detailed view of the indicated section of FIG. 11 showing an alternative profile of the holes.
Figure 15:
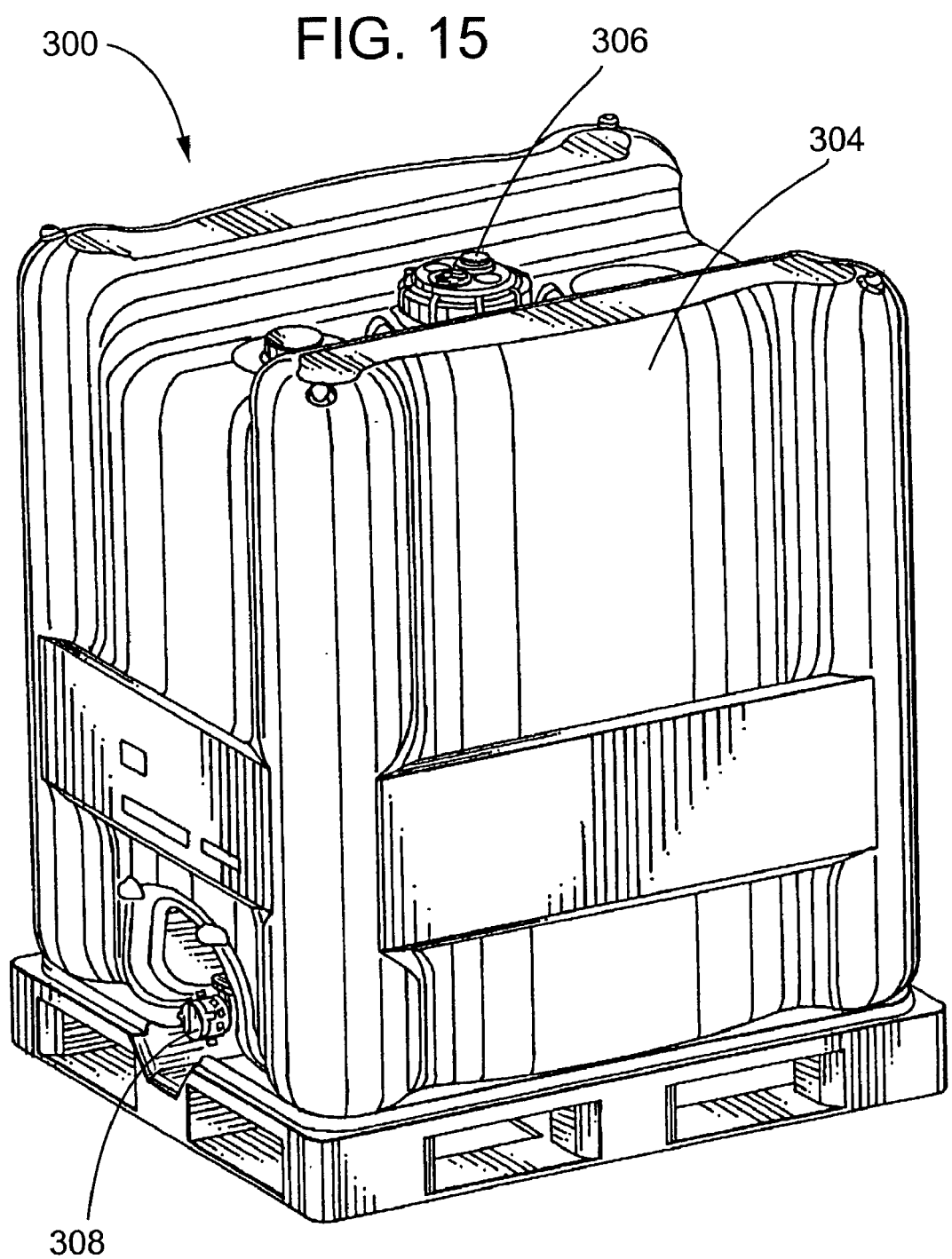
FIG. 15 is a perspective view of a tote for storing and transporting a polishing slurry.
Figure 16:
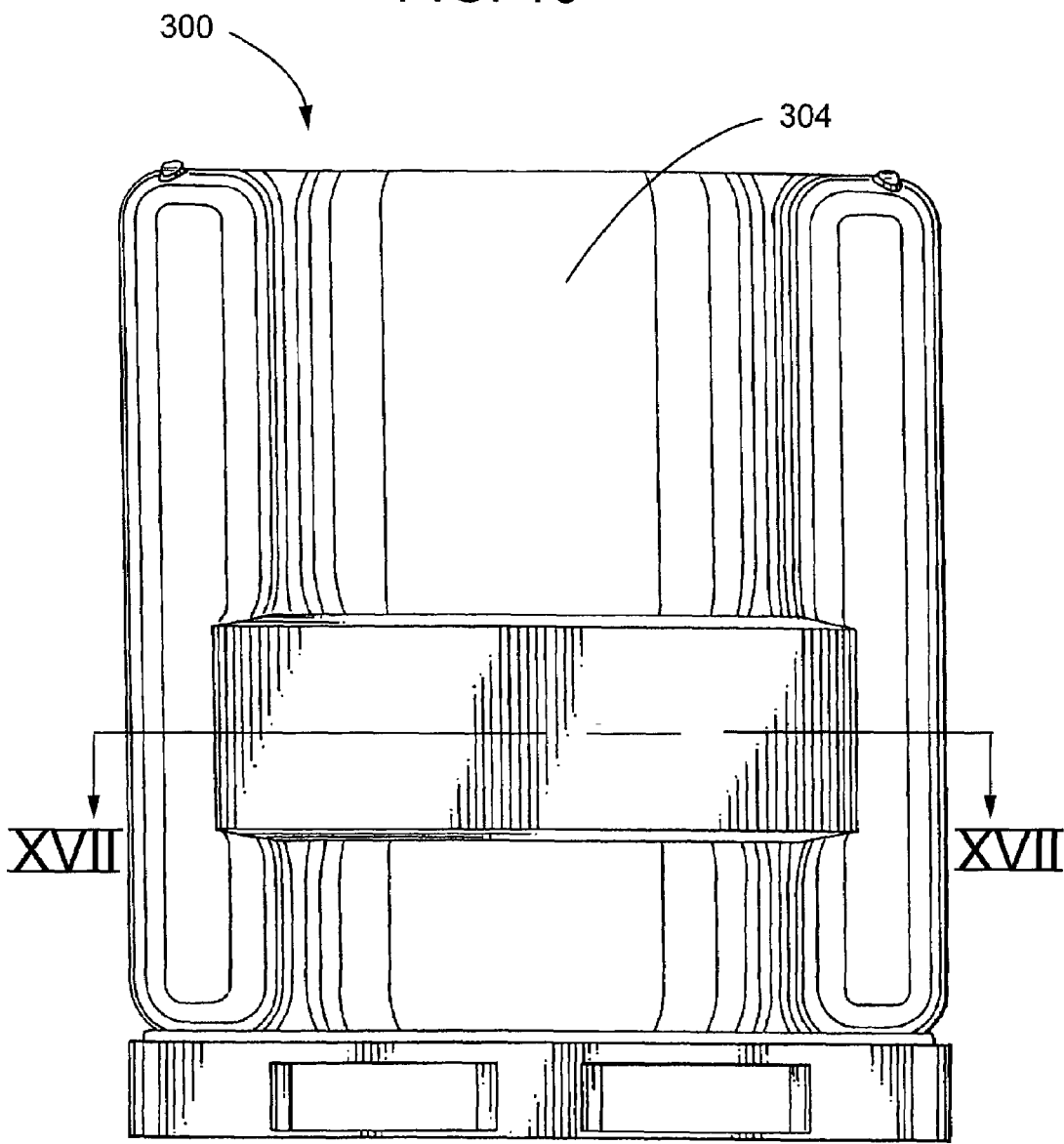
FIG. 16 is a side elevational view of the tote in FIG. 14.
Figure 17:
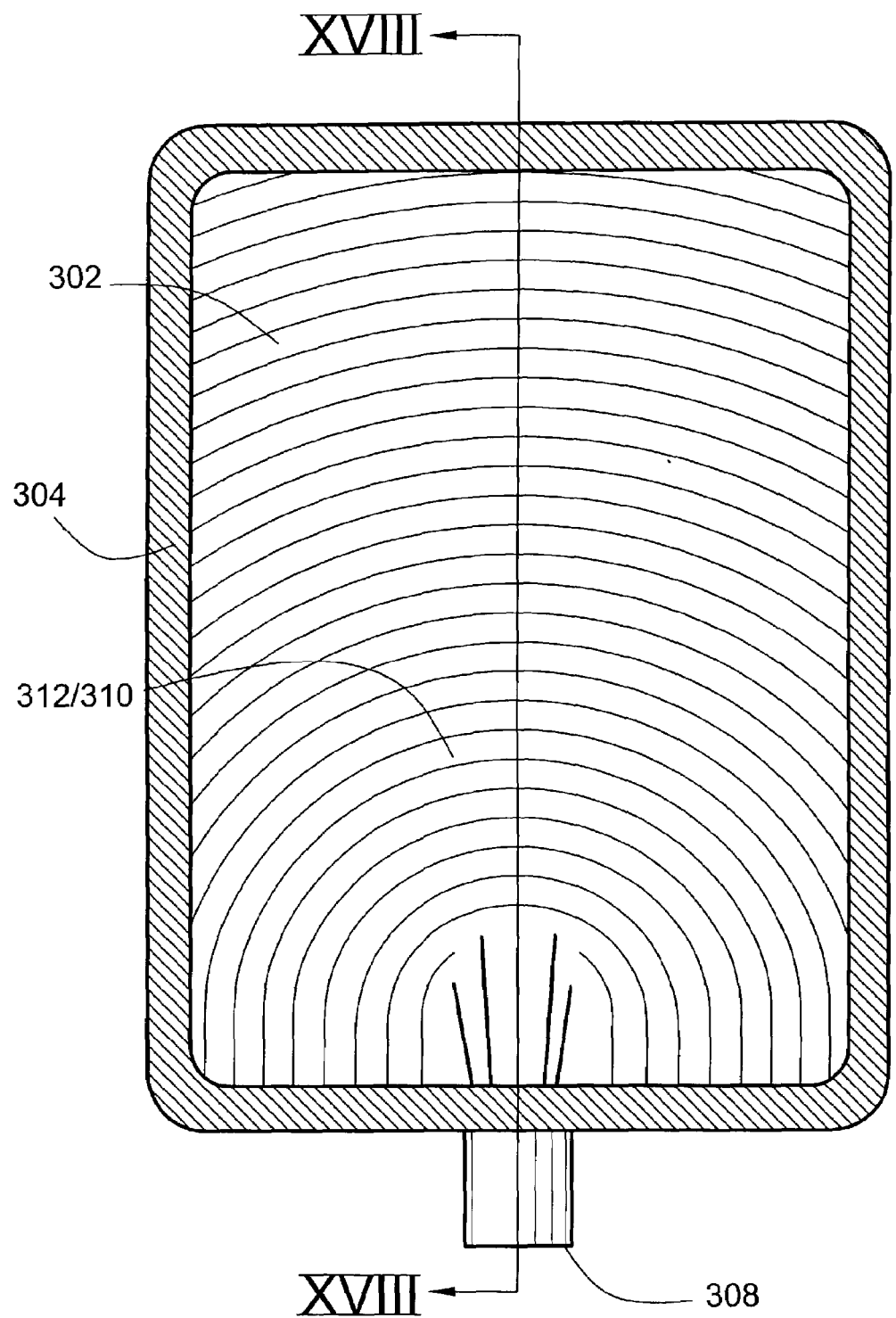
FIG. 17 is a cross-sectional view taken along line XVII—XVII of FIG. 16 showing the grooves formed in the inner surface of the tote.

In the embodiment illustrated in FIG. 11, the cavities 202 are defined by the interior surface 204 as holes disposed into the pail bottom 200. As better shown in FIG. 12, the profiles of the cavity holes 202 outlined on the interior surface 204 are circles. The term "cavity" refers to the empty space defined by a surface while the term "hole" refers to the pattern creating the empty space. The cavity holes are not intended to be limited to circular profiles. As such, the triangular profiles 212 illustrated in FIG. 13, square profiles 222 illustrated in FIG. 14, and other two-dimensional outlines and combinations thereof are all contemplated as possible profiles for the cavity holes. The shape of the cavities defined by the holes disposed into the pail bottom 200 can be the same as or similar to the shapes illustrated in any of FIGS. 4, 7, or 8. Preferably, the widths of the cavities are about 10 millimeters or less while the depths are on the order of 0.5 to 10 millimeters. The cavities function to accommodate and trap larger and/or denser abrasive particles in the above-described manner.

The embodiment illustrated in FIGS. 15-18 shows a different type of container in the form of a tote 300 for transporting and storing polishing slurries. The tote can be made from plastic, metal or other suitable material, and can have any suitable opening. The tote 300 frequently has a generally square or rectangular shape and a volumetric capacity that can range from 200 liters to 2000 liters. The tote 300 has a shell 304 defining an inner volume. Slurry can be received into the tote through an opening 306 which optionally may be capped with a screw cap or plug. To pour the slurry from the tote, a spigot 308 is disposed through the shell somewhat near the bottom of the tote. The lower inner surface 302 is graded towards spigot 308 to cause slurry to flow in that direction.

Figure 18:
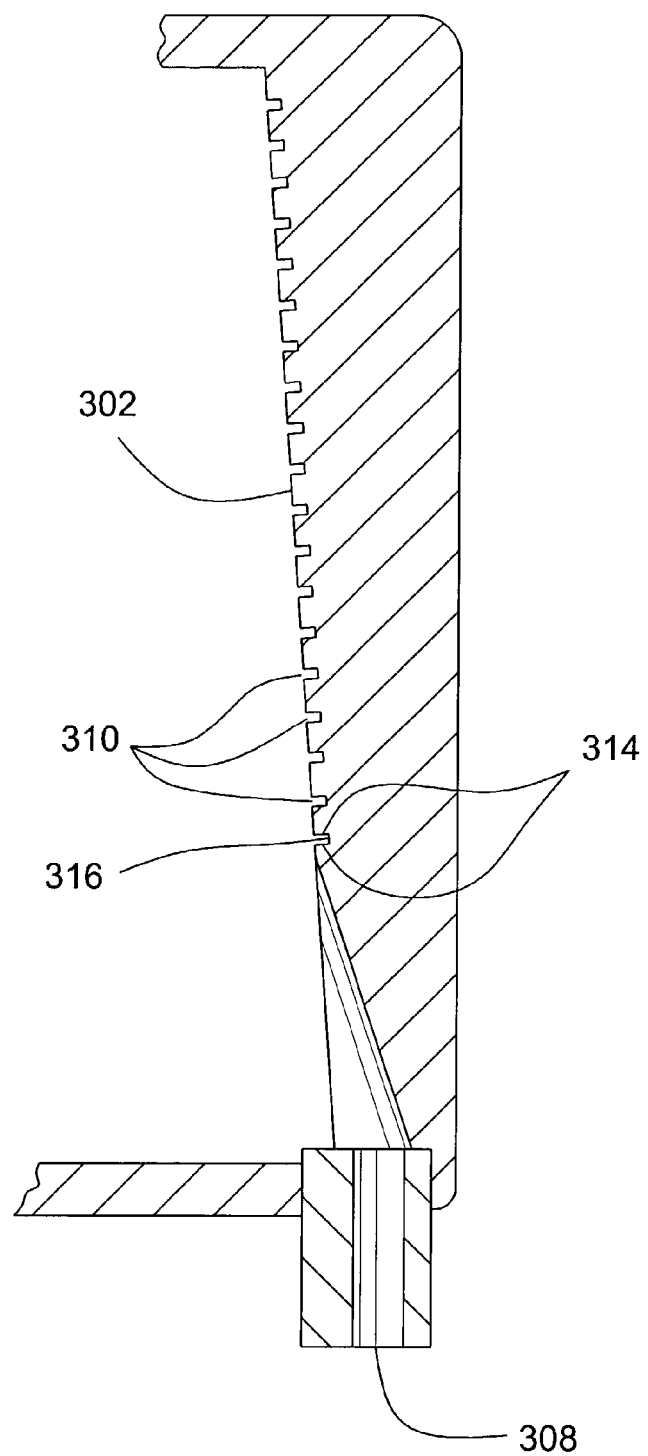
FIG. 18 is a cross-sectional view taken along line XVIII—XVII of FIG. 17.

To receive and trap large and/or dense particles that separate out of the slurry when the tote is in storage, cavities 310 are defined by the inner surface 302. In particular, the cavities are formed by grooves 312 disposed into the shell 304. The cavities function in the above-described manner to trap and retain large and/or dense abrasive particles that have separated from the slurry. To prevent outflowing slurry from removing particles entrapped in the cavities, the grooves are shaped as concentric arcs formed such that they are always orthogonal to the spigot and thus the direction of flow of the outflowing slurry. Placing the grooves at an orthogonal relationship to the spigot prevents particles trapped in the cavities from migrating toward the spigot. The cavities have a cross-section defined by two sidewalls 314 and a cavity floor 316. Though a rectangular cross-section is illustrated in FIG. 18, any of the previously illustrated cross-sections will suffice for the cavities.

Figure 19:
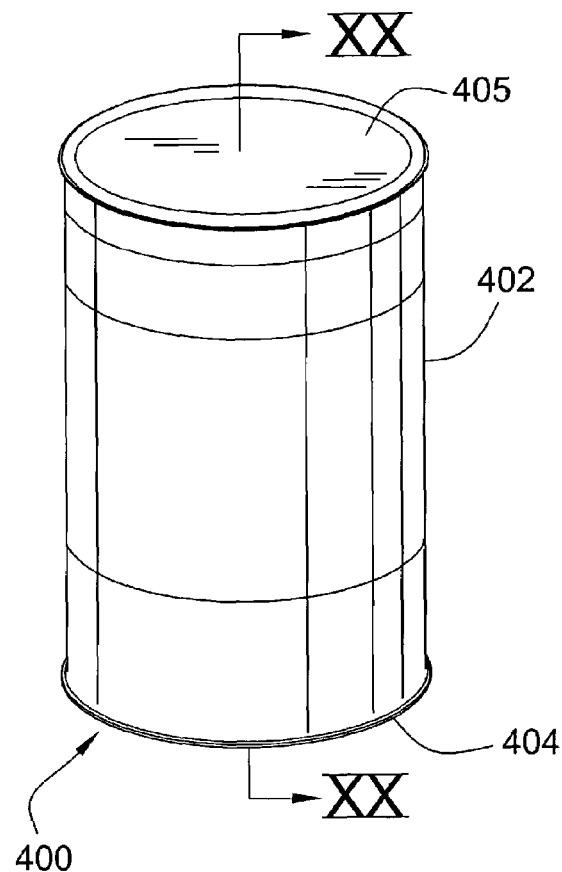
FIG. 19 is a perspective view of a drum for storing and transporting a polishing slurry.
Figure 20:
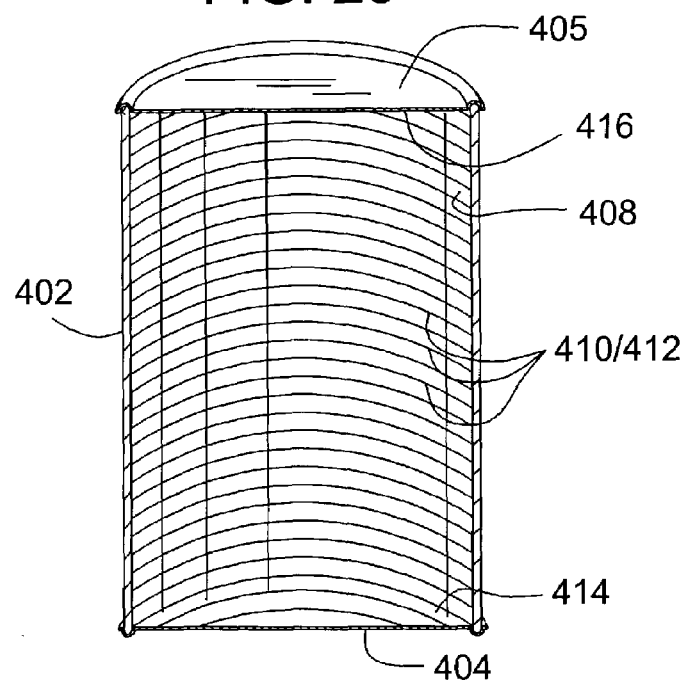
FIG. 20 is a cross-sectional view taken along line XX—XX of FIG. 19 showing the interior of the drum.

The embodiment illustrated in FIGS. 19 and 20 shows a container in the form of a drum 400 for transporting and storing polishing slurries. The drum can be made from metal, plastic, or other suitable material and can have a volumetric capacity ranging from 50 liters to 300 liters. The drum can have any suitable opening (not shown). The drum 400 has an outer cylindrical shell 402 with a first end piece 404 and second end piece 405 that define an interior volume. Because the drum 400 can be stored standing on either end piece 404, 405, or placed in a cradle resting on cylindrical shell 402, the drum 400 has no proper orientation with respect to the force of gravity. As such, the cavities for trapping larger and/or denser particles should be placed on all inner surfaces to accommodate all the possible orientations of the drum. As seen in FIG. 20, this is accomplished by forming the cylindrical inner surface 408, the first end piece inner surface 414, and the second end piece inner surface 416 to define a plurality of cavities 410.

Figure 21:
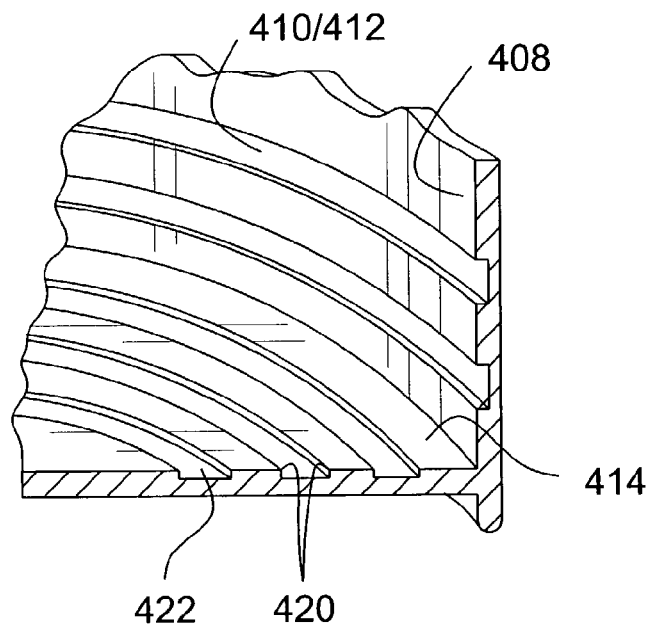
FIG. 21 is a detailed view of the section indicated in FIG. 19 showing the grooves.
Figure 22:
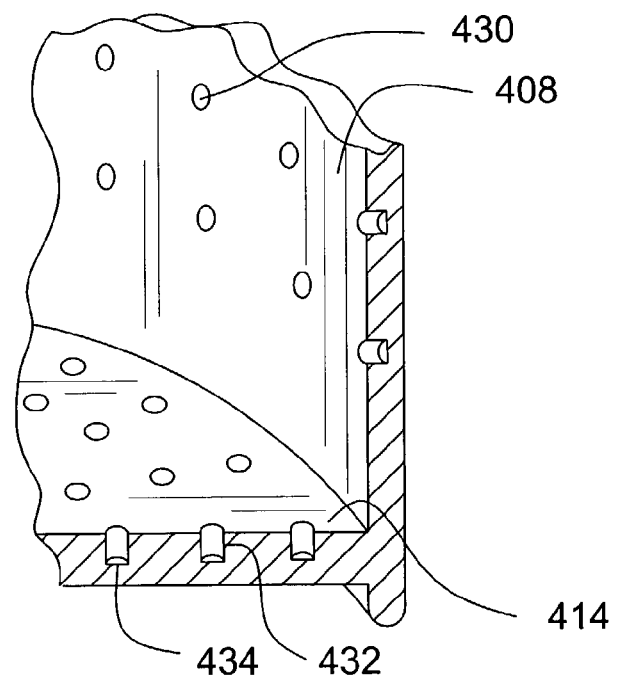
FIG. 22 is a detailed view of the section indicated in FIG. 19 showing the holes.

As illustrated in FIG. 21, to create the cavities 410, grooves 412 are disposed into cylindrical inner surfaces 408 and first end piece inner surface 414. So that the cavities function in the above-described manner, the grooves have sidewalls 420 and a cavity floor 422 as illustrated in FIG. 21. Of course, the cavities 410 need not be created by cutting grooves into the drum's inner surfaces. Accordingly, as illustrated in FIG. 22, the cavities 412 may be formed by deposing a plurality of holes 430 into the cylindrical inner surfaces 408 and the first end piece inner surface 414. Holes 430 have a sidewall 432 and a cavity floor 434 so that they can function in the above-described manner.

Figure 23:
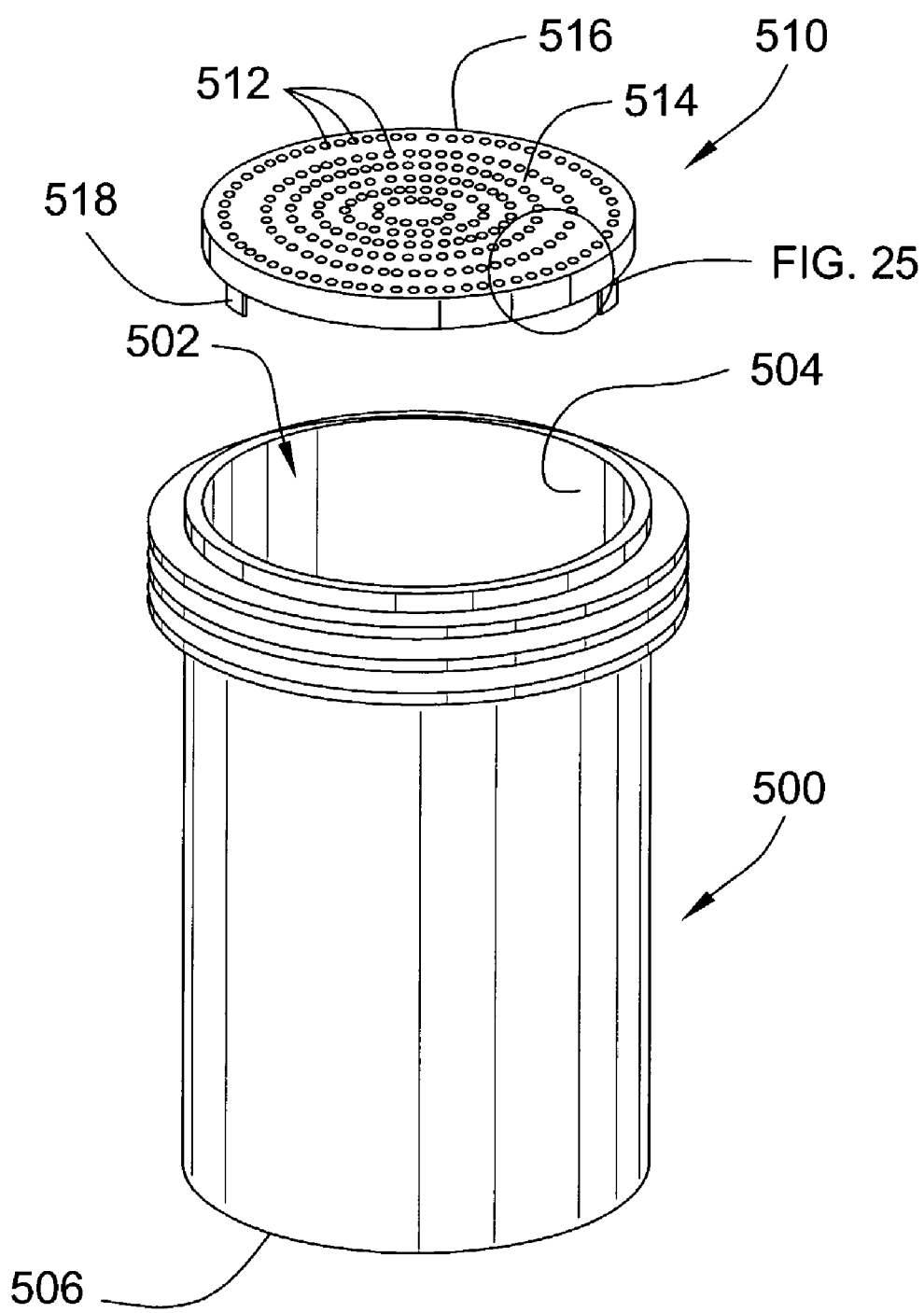
FIG. 23 is an assembly view of a container and a device for retrofitting a container.
Figure 24:
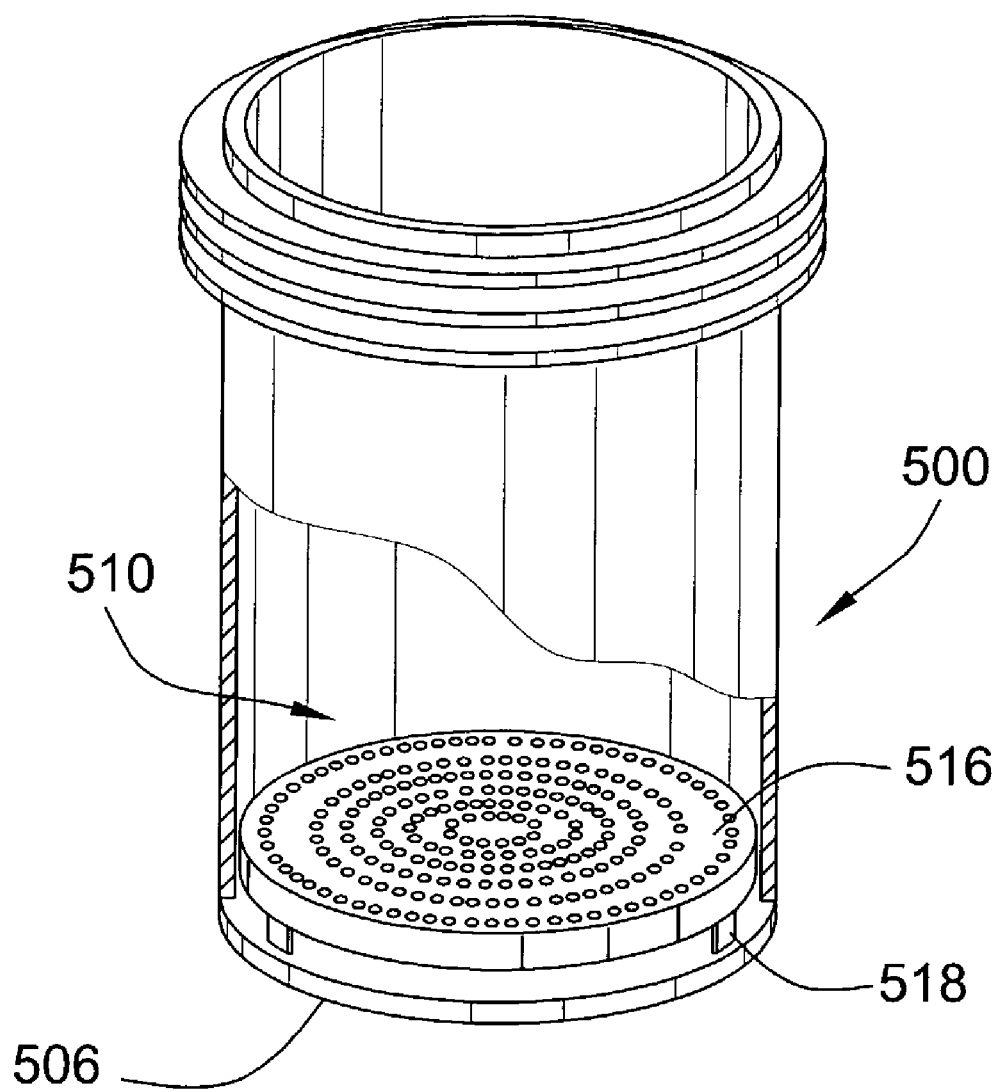
FIG. 24 is a cut-away view showing the container and device illustrated in FIG. 19 as assembled.

Illustrated in FIG. 23 is a device 510 for retrofitting an existing container 500 to provide a plurality of cavities for trapping larger and/or denser particles that have separated from a slurry. The device includes a plate 516 having a plate surface 514 defining a plurality of cavities 512. The device can be inserted through the mouth 502 of the container 500 and is preferably shaped so that the device 510 can contact the bottom 506 of the container 500 from within the container 500 and so that the outer circumference of the plate 516 makes contact with the inner surface 504 of the container. To define a region between the plate 516 and the bottom 506 of the container 500, as illustrated in FIG. 24, legs 518 are provided on device 510 that raise the device off the bottom of the container.

Figure 25:
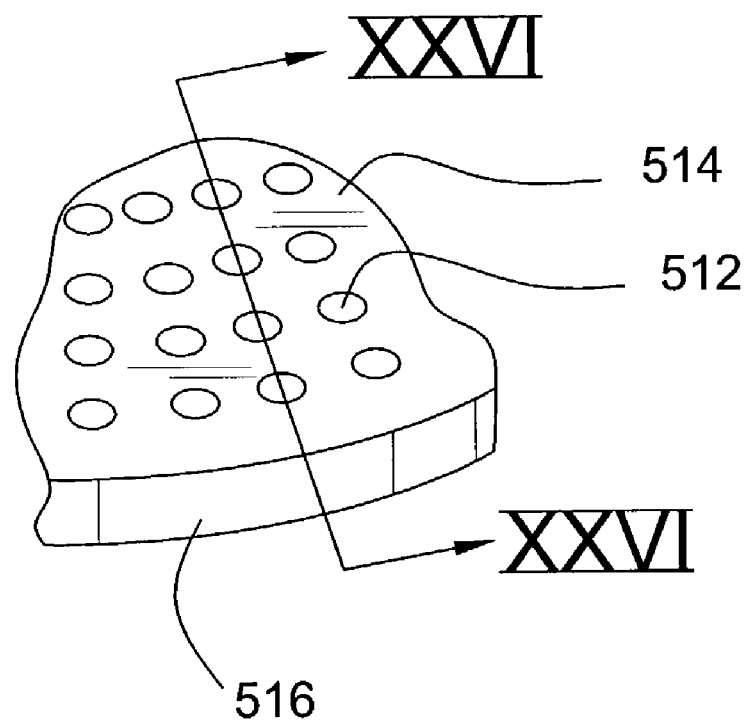
FIG. 25 is a detailed view of the section indicated in FIG. 23.
Figure 26:
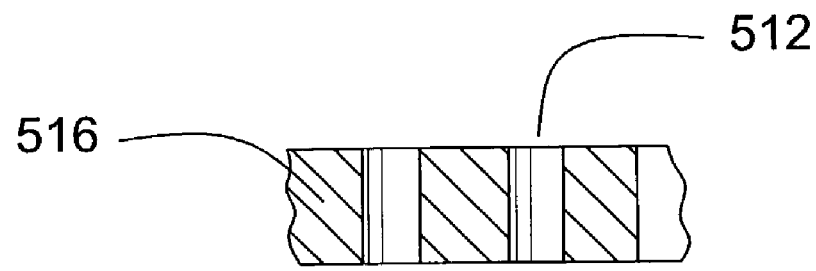
FIG. 26 is a cross-sectional view taken along line XXVI—XXVI of FIG. 25.

Referring to FIGS. 25 and 26, the cavities 512 are formed by disposing circular holes from the plate surface 514 completely through the plate 516. Of course, the profile of the holes need not be circular, and any of the aforementioned hole profiles will suffice. Furthermore, grooves disposed through the plate may be readily substituted for holes. The cavities 512 of the plate 516 can have any size, shape, or orientation as described above.

When the device 510 is inserted into the container 500 and the container is filled with a polishing slurry, larger and/or denser abrasive particles will begin to separate out of the slurry by gravimetric separation. Some of these particles will settle on the plate surface 514 while others will fall through the cavities 512 into the region defined between the plate 516 and the container bottom 506. Because of the relatively narrow width of the cavities, many of these larger and/or denser particles will be impeded from passing back through the cavities when the slurry is eventually removed from the container 500. The desirable smaller, less dense particles and slurry, however, will be able to pass back through the cavities 512. To optimize the effect of the larger and/or denser particles falling into the region, the contained slurry can be repeatedly agitated and allowed to stagnate. After pouring out the slurry, the plate 516 can be removed from the container, and the trapped, larger and/or denser particles can be properly disposed of.

Figure 27:
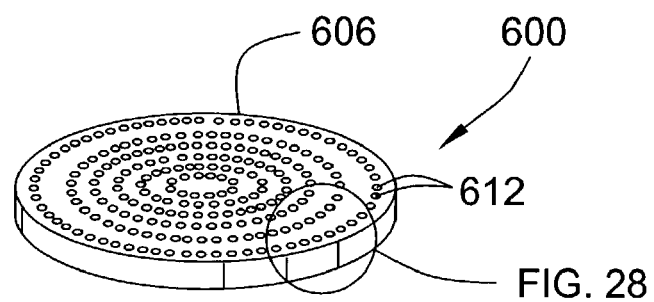
FIG. 27 is a perspective view of another device for retrofitting a container.
Figure 28:
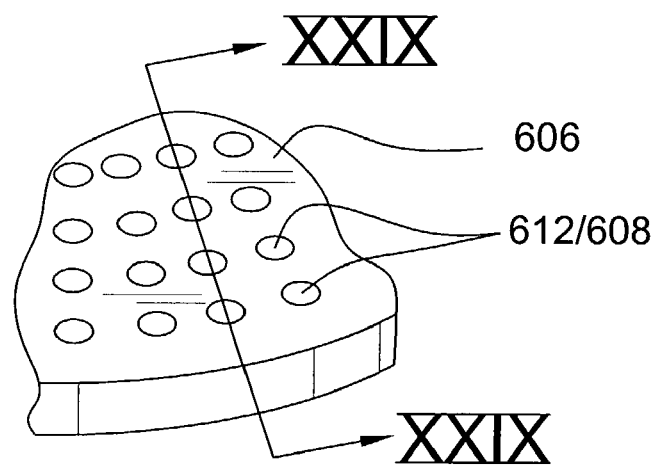
FIG. 28 is a detailed view of the section indicated in FIG. 27.
Figure 29:
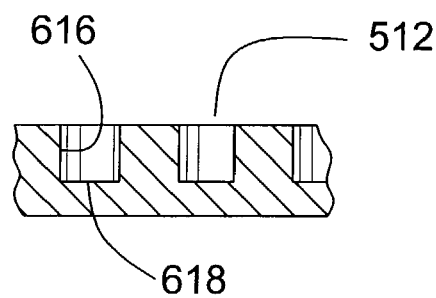
FIG. 29 is a cross-sectional view taken along line XXIX—XXIX of FIG. 28.

Illustrated in FIGS. 27–29 is another embodiment of a device for retrofitting an existing container to provide a plurality of cavities for trapping larger and/or denser particles that have separated from a slurry. The device includes a mat 600 that is inserted within and laid on the floor of the volume of a container (not shown) designed for storing and transporting polishing slurries. Preferably, to facilitate the insertion of the mat into the container and to accommodate a variety of internal configurations, the mat is made of rubber or some other flexible material that allows the mat to be folded or readily cut to size. The mat includes a mat surface 606 that defines a plurality of cavities 612. In particular, the cavities are formed by disposing a plurality of circular holes partially into the mat 600 (i.e., not through the entire width of mat 600). Of course, the profile of the holes need not be circular and any of the aforementioned hole profiles will suffice. Furthermore, grooves disposed partially into the plate may be substituted for holes.

As illustrated in FIG. 29, the holes are defined by a sidewall 616 and a cavity floor 618. Larger and/or denser particles separating out of the slurry will fall into the cavities and sink to the cavity floor. Preferably, to prevent the larger and/or denser particles from easily escaping back out of the cavity when the slurry is agitated, the cavity is relatively deep and narrow compared to the size of the larger and/or denser particles. Specifically, the recessed nature of the cavities will significantly protect the particles contained therein from the turbulent currents within the container otherwise tending to lift the particles back into the slurry. The steep walls 616 and narrow width of the cavities act as obstacles to particles attempting to escape the cavity 612. Specifically, the larger and/or denser particles rising from the cavity floor 618 will, because of their size, likely encounter the cavity walls and be deflected back into the cavity. Due to these features, the large and/or dense particles will remain trapped within the cavities when the slurry is transferred out of the container for use in a polishing process.

Desirably, the cavities have a total cavity volume, which limits the number of particles that can fall into the cavities. While the cavities typically have a total cavity volume capable of retaining about 0.1 wt. % or more (e.g., about 0.2 wt. % or more, or about 0.5 wt. % or more) of the total abrasive particles in the slurry, the cavities preferably have a total cavity volume capable of retaining no more than about 5 wt. % or less (e.g., no more than about 3 wt. % or less, or no more than about 2 wt. %) of the total abrasive particles in the slurry. Because of the tendency of the larger and/or denser particles to separate first, the cavities will tend to fill with larger and/or denser particles, leaving little or no capacity for the smaller, less dense particles that desirably remain suspended in the slurry.

The total cavity volume is dependent on the number of cavities present on the interior surface(s) of the container and the individual cavity volume. Desirably the number of cavities in the container is about 5 or more (e.g., about 10 or more, or about 15 or more). Preferably, the number of cavities is about 20 or more (e.g., about 30 or more, or even about 50 or more). The number of cavities typically will increase as the size of the container increases. However, if the volume of a single cavity is sufficiently large, the container may contain less than about 5 cavities (e.g., less than about 3 cavities, or perhaps only one such cavity). For example, when the cavity is a continuous spiral, the container can contain only one such cavity, which provides the desired total cavity volume. Preferably, the cavities (or cavity) have a dimension (e.g., length) that is about the same as or greater than the largest dimension (e.g., length, width, diagonal, diameter) of the container, especially when the number of cavities is less than about 10 (e.g., less than about 5, less than about 3, or about 1). In some embodiments, the cavity or cavities will have a length dimension on the order of about 1 meter or more (e.g., 5 meters or more, or even 10 meters or more).

The containers of the invention typically are used in conjunction with a polishing apparatus. The polishing apparatus comprises the container, a polishing slurry contained therein, a polishing tool, and a means for transporting the slurry from the container to the polishing tool. Any suitable device can be used to transport the polishing slurry from the storage container to the polishing tool, many of which are known in the art. For example, the slurry can be transported through a pipe, tube, or trough either by gravity flow or through the use of a pump. In some embodiments, the polishing slurry is first transported from the storage container into one or more temporary slurry-containing devices, for example a slurry tank and/or a mixing tank. The polishing tool typically comprises a carrier for holding a substrate to be polished and a polishing pad onto which the polishing slurry is applied (e.g., sprayed or dropped). The polishing apparatus optionally further comprises a mixing tank and/or a filter for filtering the slurry.

Figure 30:
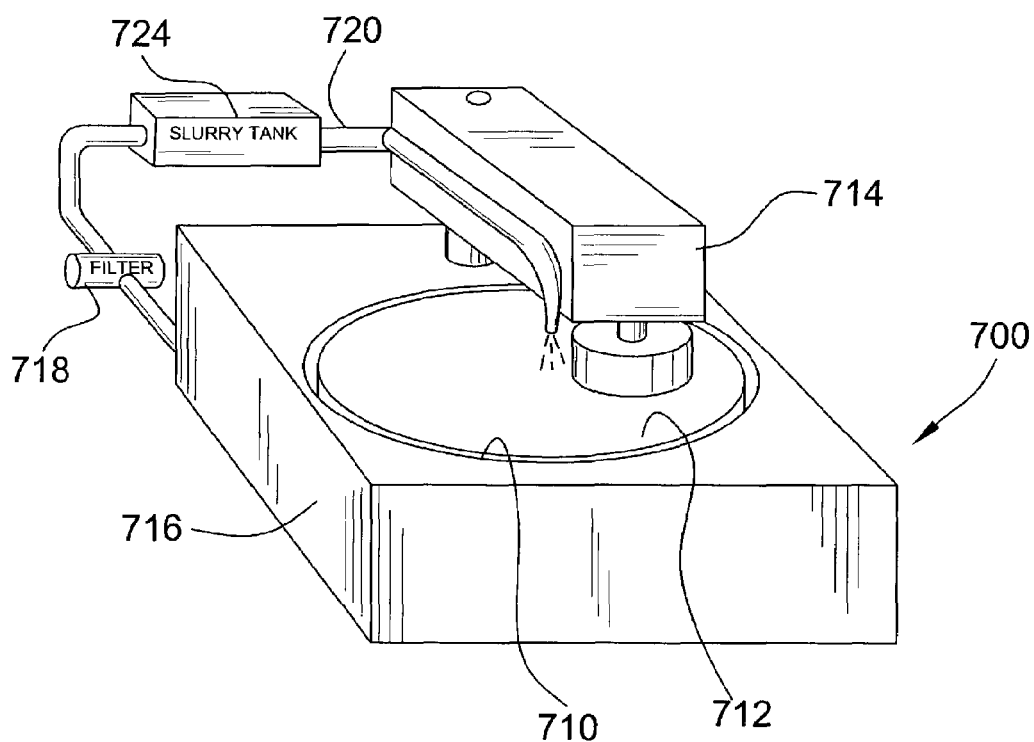
FIG. 30 is a perspective view of a polishing tool.

Illustrated in FIG. 30 is an exemplary polishing tool 700 for polishing a substrate. The tool 700 includes a platen 710, a polishing pad 712, and a carrier 714 for holding the substrate. To disperse the polishing slurry onto the polishing pad, slurry tube 720 communicates with slurry tank 724 in which the slurry is contained. Optionally the polishing tool further comprises a distribution loop to recycle the slurry after use. In particular, the slurry is allowed to collect in a reservoir located inside the polishing table 716 where return tube 722 returns the slurry to the slurry tank 724. In other embodiments, the polishing tool can direct the used slurry on to a waste tank. For removing foreign particles that may contaminate the slurry, the distribution loop may include a filter 718.

Figure 31:
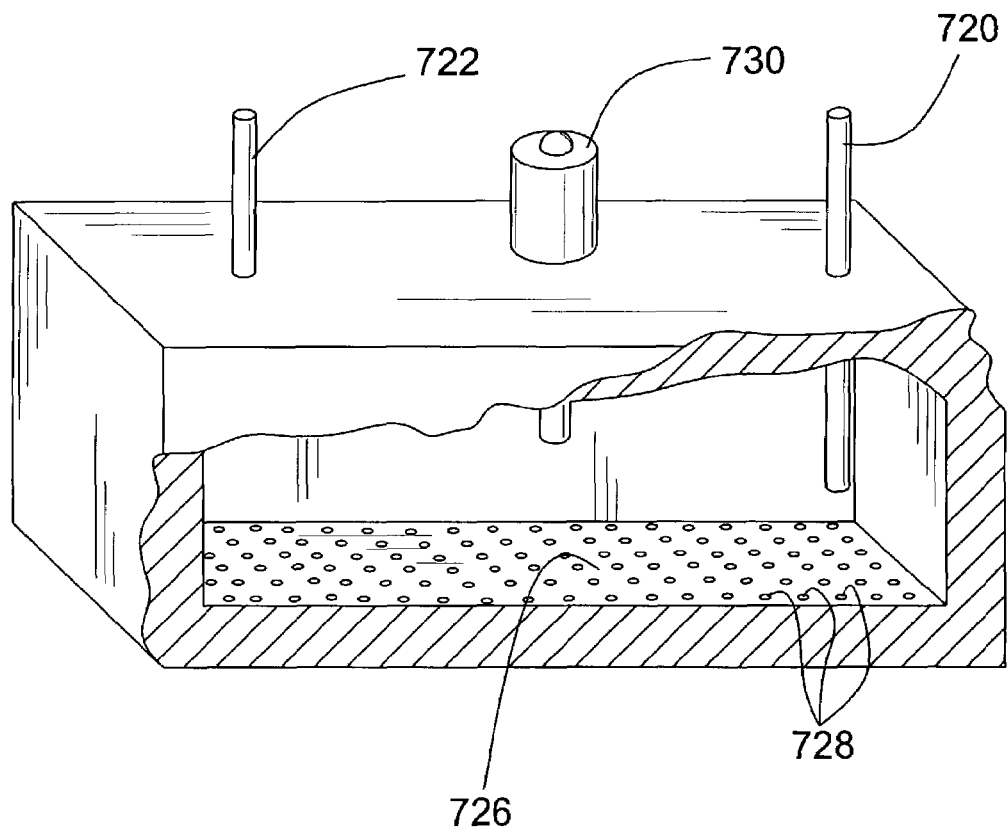
FIG. 31 is a cut-away view of a slurry tank included with a polishing tool.

In some embodiments, the slurry tank contains cavities as described above. The inside of such a slurry tank 724 is better illustrated in FIG. 31. The slurry tank includes a lower interior surface 726 that defines a plurality of cavities 728. In particular, the cavities 728 are formed by disposing a plurality of circular holes partially into the lower interior surface 726 of the slurry tank 724. Of course, the profile of the holes need not be circular, and any of the aforementioned hole profiles will suffice. Furthermore, grooves disposed partially through the slurry tank may be readily substituted for holes. When the tool is not in operation and the slurry inside the tank 724 remains substantially stagnate, allowing larger and/or denser particles to separate out of the slurry and fall into the cavities 728 in the above-described manner. When the tool is in operation and the slurry flows through the distribution loop and thereby agitates the contents of the tank, the recessed nature of the cavities prevents the larger and/or denser particles from escaping back into the slurry. Preferably, the inlet of slurry tube 720 is not in close proximately to the cavities 728.

Preferably, to maintain a uniform distribution of desirable particles throughout the slurry, a stirrer 730 is provided in the container for stirring or agitating the slurry. The stirrer may be a propeller, a dip-tube re-circulation pump, an aerator, a paddle, or some other such device. Advantageously, because of the size and shape of the cavities, the stirrer will not cause the larger and/or denser particles that have settled into the cavities to become re-suspended back into the slurry. Desirably, after use, particles retained in the cavities (e.g., the larger and/or denser particles) are removed from the cavities to enable the container to be reused.

Thus, the invention provides apparatuses and methods for trapping and removing large and/or dense, abrasive particles from a polishing slurry stored in a container. Cavities formed on the inner surface of the container receive the larger and/or denser particles that, because of their heavier mass, settle out from the slurry by gravimetric separation. The size and profile of the cavities are designed so that the larger, more massive particles cannot easily work their way back into the slurry but rather become trapped within the cavities.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A container for transporting and/or storing a polishing slurry having abrasive particles suspended therein, the container comprising:
   an interior surface defining a volume for storing the slurry, the interior surface further defining a cavity for retaining abrasive particles settling from the slurry; and
   an opening for receiving and/or emptying the slurry,
   wherein the container defines a volumetric capacity and the cavity is sized to retain about 0.1 wt. % to about 5 wt. % of the total abrasive particles in the slurry when the container is filled to capacity, and
   wherein the cavity has (a) a width from about 0.5 mm to about 10 mm, (b) a depth from about 0.5 mm to about 10 mm, or (c) a width from about 0.5 mm to about 10 mm and a depth from about 0.5 mm to about 10 mm.

2. The container of claim 1, wherein the cavity is a plurality of cavities.

3. The container of claim 1, wherein the plurality of cavities numbers about 5 or more cavities.

4. The container of claim 1, wherein the plurality of cavities numbers about 20 or more cavities.

5. The container of claim 1, wherein the container defines a volumetric capacity and the cavity is sized to retain between about 0.5 wt. % to about 5 wt. % of the total abrasive particles in the slurry when the container is filled to capacity.

6. The container of claim 1, wherein the cavity has a width from about 0.5 mm to about 10 mm.

7. The container of claim 1, wherein the cavity has a depth from about 0.5 mm to about 10 mm.

8. The container of claim 2, wherein the plurality of cavities are shaped in the form of holes.

9. The container of claim 8, wherein the shape of the holes is circular, square, triangular, rectangular, or combinations thereof.

10. The container of claim 1, wherein the cavity is shaped in the form of a groove.

11. The container of claim 10, wherein the cavity has a dimension that is about the same as or greater than the largest dimension of the container.

12. The container of claim 10, wherein the groove is arranged as a spiral, a cross hatch, or combinations thereof.

13. The container of claim 2, wherein the plurality of cavities are in the form of grooves.

14. The container of claim 13, wherein the grooves are arranged as concentric circles, multiple spirals, straight lines, arcs, or combinations thereof.

15. The container of claim 2, wherein the cavities are separated from each other by a distance of about 2 mm to a distance of about 20 mm.

16. The container of claim 2, wherein the plurality of cavities are separated by a distance of about 2 mm or less.

17. The container of claim 1, wherein the container is cylindrical, square, or rectangular in shape.

18. The container of claim 1, wherein the container has a volumetric capacity of about 1 liter to about 2,000 liters.

19. The container of claim 1, wherein the container is made of plastic.

20. A method of removing large and/or dense abrasive particles from a polishing slurry comprising abrasive particles suspended in a liquid carrier, the method comprising:
    providing a container having an interior surface defining a volume for storing the slurry and a cavity for retaining abrasive particles settling from the slurry;
    introducing the slurry into the container;
    allowing abrasive particles in the slurry to settle by gravimetric separation such that a portion of the abrasive particles is disposed in the cavity;
    removing the slurry from the container while retaining the portion of the abrasive particles in the cavity, wherein the retained abrasive particles are about 0.5 wt. % to about 5 wt. % of the total wt. % of abrasive particles in the slurry when the container is filled to capacity.

21. The method of claim 20, wherein the interior surface defines a plurality of cavities.

22. The method of claim 20, wherein the retained abrasive particles are about 0.5 wt. % to about 5 wt. % of the total wt. % of abrasive particles in the slurry when the container is filled to capacity.

23. The method of claim 20, further comprising the step of stirring the slurry.

24. The method of claim 20, further comprising the step of filtering the slurry.

25. A polishing apparatus comprising the following:
    a container including an opening for receiving a slurry having abrasive particles suspended therein, the container further including an interior surface defining a volume for storing the slurry and a cavity, wherein the cavity is sized to retain about 0.1 wt. % to about 5 wt. % of the total abrasive particles in the slurry when the container is filled to capacity,
    a polishing tool including a platen, a polishing pad, and a carrier for holding a wafer to be polished; and
    a means for transporting the slurry from the container to the polishing tool.

26. The polishing apparatus of claim 25, wherein the interior surface defines a plurality of cavities.

27. The polishing apparatus of claim 25, wherein the apparatus further comprises a stirrer for stirring or agitating the slurry in the container.

28. The method of claim 20, wherein the cavity has (a) a width from about 0.5 mm to about 10 mm, (b) a depth from about 0.5 mm to about 10 mm, or (c) a width from about 0.5 mm to about 10 mm and a depth from about 0.5 mm to about 10 mm.

29. The apparatus of claim 25, wherein the cavity has (a) a width from about 0.5 mm to about 10 mm, (b) a depth from about 0.5 mm to about 10 mm, or (c) a width from about 0.5 mm to about 10 mm and a depth from about 0.5 mm to about 10 mm.

* * * * *